US011361884B2

(12) United States Patent
Esseghir et al.

(10) Patent No.: US 11,361,884 B2
(45) Date of Patent: Jun. 14, 2022

(54) PEST-RESISTANT CABLE JACKETING

(71) Applicant: Dow Global Technologies LLC, Midland, MI (US)

(72) Inventors: Mohamed Esseghir, Lawrenceville, NJ (US); Arne Ulbrich, Midland, MI (US); William J. Harris, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 150 days.

(21) Appl. No.: 16/629,224

(22) PCT Filed: Jun. 27, 2018

(86) PCT No.: PCT/US2018/039783
§ 371 (c)(1),
(2) Date: Jan. 7, 2020

(87) PCT Pub. No.: WO2019/013976
PCT Pub. Date: Jan. 17, 2019

(65) Prior Publication Data
US 2020/0135363 A1  Apr. 30, 2020

Related U.S. Application Data

(60) Provisional application No. 62/531,416, filed on Jul. 12, 2017.

(51) Int. Cl.
*H01B 7/02* (2006.01)
*H01B 7/18* (2006.01)
(Continued)

(52) U.S. Cl.
CPC ............. *H01B 7/1875* (2013.01); *H01B 3/28* (2013.01); *H01B 3/441* (2013.01); *H01B 7/0216* (2013.01)

(58) Field of Classification Search
USPC ........... 174/110 R, 110 AR, 110 SR, 110 FC, 174/110 V, 113 R, 120 R, 120 C, 120 AR
See application file for complete search history.

(56) References Cited

U.S. PATENT DOCUMENTS 3,755,224 A * 8/1973 Lutz, Jr. ............... C08K 5/0016
523/122
4,171,463 A  10/1979 Watkins
(Continued)

FOREIGN PATENT DOCUMENTS

CN  202362506 U  8/2012
CN  105713236 A  6/2016
(Continued)

OTHER PUBLICATIONS

Office Action from corresponding Russian Patent Application No. 2020104992, dated Jan. 3, 2022.
(Continued)

*Primary Examiner* — William H. Mayo, III

(57) ABSTRACT

A protective jacket for cable includes (a) an exterior layer (1) free of a pest repellant, and (2) having external and internal facial surfaces; (b) an inner layer (1) having a shore d hardness of equal to or greater than (≥) 63, (2) including a pest repellant, and (3) having two facial surfaces; and (c) optionally, a tie layer in contact with the internal facial surface of the exterior layer and a facial surface of the inner layer.

13 Claims, 2 Drawing Sheets

Denatonium-doped polymer coupons during incubation in centrifuge tubes

(51) Int. Cl.
*H01B 3/28* (2006.01)
*H01B 3/44* (2006.01)

(56) References Cited

U.S. PATENT DOCUMENTS

| | | | |
|---|---|---|---|
| 5,002,768 A | 3/1991 | Kondo et al. | |
| 5,238,749 A * | 8/1993 | Cueman | B05D 1/06 |
| | | | 424/409 |
| 5,246,783 A | 9/1993 | Spenadel et al. | |
| 6,468,554 B1 | 10/2002 | Ichino | |
| 6,496,629 B2 | 12/2002 | Ma et al. | |
| 6,714,707 B2 | 3/2004 | Rossi et al. | |
| 7,772,492 B2 * | 8/2010 | Parsons | H01B 7/2806 |
| | | | 174/11 OR |
| 2002/0106392 A1 | 8/2002 | Ichino | |
| 2004/0213743 A1 | 10/2004 | Ichino et al. | |
| 2009/0012350 A1 | 1/2009 | Tihon | |
| 2010/0260872 A1 | 10/2010 | Dussich, Jr. et al. | |
| 2011/0030990 A1 * | 2/2011 | Francis | A01N 25/34 |
| | | | 174/11 OAR |
| 2016/0315457 A1 | 10/2016 | Winer | |

FOREIGN PATENT DOCUMENTS

| | | |
|---|---|---|
| EP | 1017748 B1 | 12/2002 |
| GB | 893819 | 4/1962 |
| JP | 58187906 U | 12/1983 |
| JP | 61039410 A | 2/1986 |
| JP | 3015114 A | 1/1991 |
| JP | 9219116 A | 8/1997 |
| JP | 03223801 B2 | 10/2001 |
| JP | 2004292317 A | 10/2004 |
| JP | 2007161960 A | 6/2007 |
| JP | 05376263 B2 | 12/2013 |
| KR | 1417907 B1 | 7/2014 |
| WO | 199959166 A2 | 11/1999 |
| WO | 2004069534 A1 | 8/2004 |

OTHER PUBLICATIONS

Office Action from corresponding Chinese Patent Application No. 201880052711.X, dated Oct. 25, 2021.

Office Action from corresponding Japanese 2019-542579 application, dated Mar. 11, 2022.

\* cited by examiner

Figure 1. Denatonium-doped polymer coupons during incubation in centrifuge tubes
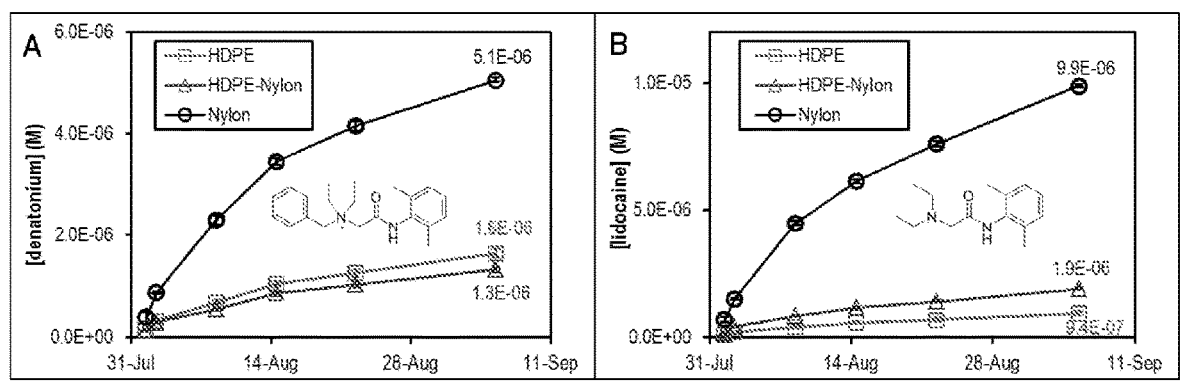
Figures 2A-2B. Comparison of observed leaching from HDPE, HDPE/NYLON, and NYLON coupons. 2A: Concentration of denatonium in solution over time. 2B: Concentration of lidocaine, a degradation product of denatonium benzoate in solution over time. Error bars: sample standard deviation (n = 6).

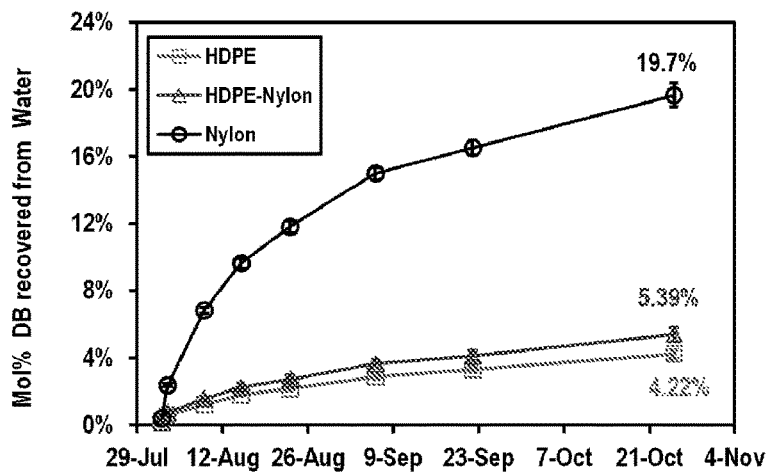

Figure 3. Denatonium benzoate Leachate as Combined Denatonium benzoate and Lidocaine

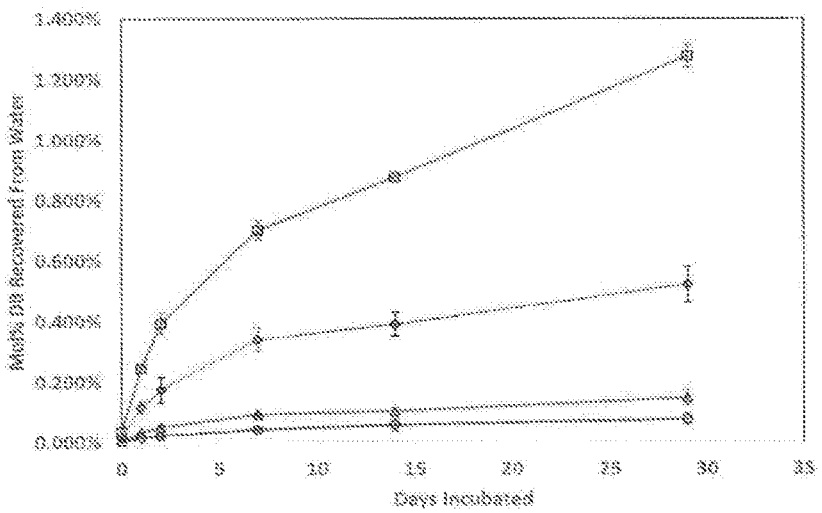

Figure 4. Denatonium Benzoate Leachate as Combined Denatonium Benzoate and Lidocaine from Control and Laminates ☐ - Control, Denatonium Benzoate into UNIVAL™ DMDA-6400 NT7 with Wollastonite and AMPLIFY™ TY1053H.
◇ - Filled HDPE Laminate.
△ - MYLAR™ Laminate (PET – Polyethylene Terephthalate).
○ - Polybutylene Terephthalate (PBT) Laminate.

PEST-RESISTANT CABLE JACKETING

FIELD OF THE INVENTION

This invention relates to cable jacketing.

BACKGROUND OF THE INVENTION

Damage by pests, e.g., rodents, termites, etc., to telecommunication, electrical, and power cables is an old and expensive problem. Not only is the cable damaged, which can result in diminished efficiency or the need for outright replacement, but costs can also be incurred if the cable fails and operations that relied upon the information and/or power that the cable provided are interrupted. Over the years a number of different responses have been developed and while most are effective to one degree or another, all leave room for new approaches.

Obvious early solutions include armoring the cable in metal or incorporating continuous fiber into the protective outer cable jacket. These approaches, however, resulted in cable with reduced flexibility, increased size and/or weight, and higher fabrication and installation costs.

Alternative solutions are exemplified by U.S. Pat. Nos. 5,002,768 and 6,468,554, US Patent Publication Nos. 2010/0260872 and 2016/0315457, EP 1 017 748, JP 03223801 and 05376263, CN 1051093457, and KR 1417907. One common feature of all of these disclosures is the incorporation of a repellant into the protective jacket of the cable that once tasted or ingested by the pest, e.g., a rodent, discourages it from continued attack, e.g., gnawing, on the cable. These repellants are typically a capsaicin (hot, spicy) and/or a denatonium salt (bitter). These disclosures typically differ from one another in the manner in which these repellants are incorporated into the cable and/or their positioning within the cable.

SUMMARY OF THE INVENTION

In one embodiment the invention is a multilayer protective jacket for a cable, the jacket comprising:
 (A) an outer layer (1) free of a pest repellant, and (2) having external and internal facial surfaces;
 (B) an inner layer (1) having a Shore D hardness of equal to or greater than ($\geq$) 63, (2) comprising a pest repellant, and (3) having two facial surfaces; and
 (C) optionally, a tie layer in contact with the internal facial surface of the exterior layer and a facial surface of the inner layer.

In one embodiment the tie layer is present. In one embodiment the tie layer is absent and the internal facial surface of the outer layer is in contact with a facial surface of the inner layer. In one embodiment the pest repellant is a gustatory repellant. In one embodiment the pest repellant is an insect repellant. In one embodiment the repellant comprises both a gustatory repellant and an insect repellant.

In one embodiment the invention is a cable comprising the cable jacket.

BRIEF DESCRIPTION OF THE DRAWINGS

FIG. 1 is an image showing denatonium-doped polymer coupons during incubation in centrifuge tubes.

FIGS. 2A and 2B are graphs showing a comparison of observed leaching from HDPE, HDPE/Nylon, and Nylon. FIG. 2A shows the concentration of denatonium benzoate in solution over time. FIG. 2B shows the concentration of lidocaine, a degradation product of denatonium benzoate, over time. Error bars: sample standard deviation (n=6).

FIG. 3 is a graph showing denatonium benzoate leachate as combined denatonium benzoate and lidocaine.

FIG. 4 is a graph showing denatonium benzoate leachate as combined denatonium benzoate and lidocaine from control and laminates.

DETAILED DESCRIPTION OF THE PREFERRED EMBODIMENT

Definitions

For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

Unless stated to the contrary, implicit from the context, or customary in the art, all parts and percents are based on weight and all test methods are current as of the filing date of this disclosure. The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

"Cable," "power cable," "transmission line" and like terms refer to at least one wire or optical fiber within a protective covering. Typically, a cable is two or more wires or optical fibers bound together, typically in a common protective covering. The individual wires or fibers inside the covering may be bare or insulated. The covering typically comprises one or more semiconductive sheaths, one or more insulation sheaths, and a protective outer jacket. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Multilayer" means at least two layers.

"Tie layer", "adhesive layer" and like terms mean a layer that binds two layers together. In a 3-layer lamination of an exterior layer A, a tie layer B, and an inner layer C, tie layer B is positioned between and is in contact with opposing facial surfaces of layers A and C thus joining layers A and C to one another.

"Facial surface," "planar surface" and like terms refer to the flat surfaces of the layers that are in contact with the opposite and adjacent surfaces of the adjoining layers. Facial surfaces are distinct from edge surfaces. A rectangular layer comprises two facial surfaces and four edge surfaces. A circular layer comprises two facial surfaces and one continuous edge surface.

"Repellant", "pest repellant", and like terms mean a substance that deters rodents, insects and/or other pests from gnawing, attacking, or settling on an object, e.g., a cable. A gustatory repellant is a repellant that deters or discourages a pest through taste or ingestion of the repellant, i.e., the pest dislikes the taste and/or experiences discomfort upon consuming the repellant and thus ceases to bite into the object containing the repellant. An insect repellant is a repellant that deters or discourages an insect (arthropods generally), from landing on, settling on and/or attacking, an object. An insect repellant usually does not require the insect to ingest the repellant to be effective. In some instances, a repellant is also a pesticide.

"Free of repellant", "free of pest repellant" and like terms mean that the material from which the exterior layer is fabricated is without or substantially without repellant content, i.e., the material contains less than (<) 0.0001 wt %, or <0.00005 wt %, or <0.00001 wt %, or <0.000001 wt %, of repellant as measured by gas or liquid chromatography or a similar analytical method. Repellant content of less than this amount is considered inconsequential to the efficacy of the invention.

Exterior Layer

The outer layer, also known as a barrier layer, is the outermost layer of the protective jacket construction, and it is an impediment that prevents or slows the leaching of the pest repellant of the inner layer into the environment in which the cable is located thus improving deterrent efficacy and cable longevity and at the same time reducing environmental impact. The outer layer is free of pest repellant and in one embodiment, it has a Shore D hardness of equal to or greater than (≥) 63, or >67 or ≥70, or ≥80, or ≥90, as measured by ASTM D2240.

The outer layer comprises two facial surfaces, an external surface and an internal surface. The external surface is exposed to the environment in which the cable is used, and the internal surface is in contact with a facial surface of the inner layer, or if a tie layer is present, a facial surface of the tie layer. In one embodiment the external surface of the exterior layer has a roughness, also known as a smoothness, from 25 micron-inch (μ-inch), or 30 μ-inch, or 35 μ-inch, or 40 μ-inch, or 50 μ-inch, to 80 μ-inch, or 70 μ-inch, or 60 μ-inch. The roughness of the external surface of a conductor jacket is measured according to ANSI 1995 via a SURFT-EST™ SV-400 Series 178 Surface Texture Measuring Instrument. A wire sample is placed in a V-Block and the stylus (10 urn) is lowered down to a specific start position (about 1 gram force is applied to wire). At a fixed rate of 2 (millimeter per second) the stylus is moved in the transverse direction taking measurements. Four readings per wire sample and four samples are tested which are then averaged with values reported in μ-inch. The more smooth, or less rough, the surface, the more difficult for a rodent or other pest to successfully bite, gnaw or otherwise attack the surface because the pest experiences slippage in its bite or other attack mechanism.

The composition of the outer layer can vary widely, and includes, but is not limited to, polyester, polyamide and polyolefins. In one embodiment, the outer layer is a semicrystalline polyester and the polyester can be either polyethylene terephthalate, polybutylene terephthalate, polytrimethylene terephthalate, or polyethylene napthalate, as well as their semi-crystalline copolymers. In one embodiment, the outer layer is a filled high density polyethylene (HDPE). In one embodiment, the outer layer is a polyamide and the polyamide can be either Nylon 6, Nylon 66, Nylon 11, or Nylon 12. These polymers can be used alone or in combination with one another. These polymers can be filled or unfilled and if filled, the filler is any substance that promotes the hardness of the outer layer, e.g., a mineral or milled fiber with a Mohs hardness equal to or greater than 4, or 5; or a polymer with a Shore D hardness of ≥63 as measured by ASTM D2240. Examples of such fillers include, but are not limited to, wollastonite, milled glass fiber, milled aramid fiber, milled carbon fiber, etc. Examples of such polymers include, but are not limited to, polypropylene, Nylon 6, Nylon 66, Nylon 11, Nylon 12, polyethylene terephthalate and polybutylene terephthalate. The milled fibers used in the practice of this invention typically have an aspect ratio (i.e., length over diameter) of less than about 13, or 12, or 11, or 10, or 9, or 8, or 7, or 6, or 5.

Inner Layer

The inner layer is characterized as comprising a pest repellant and having a Shore D hardness of equal to or greater than (≥) 63, or ≥67.5 as measured by ASTM D2240. The repellant can be any substance that deters or discourages the pest from approaching, settling on, and/or attacking, e.g., biting, the cable. The repellant can be gustatory or non-gustatory.

Typical gustatory repellents include, but are not limited to, capsaicinoids; denatonium salts, e.g., denatonium benzoate, denatonium saccharide; cycloheximide; piperine; menthol; camphor; salicylate esters; tributyl tin compounds; eucalyptus oil; allicin; mint oil, wintergreen; plant products such as garlic, onion, ginger, wasabi extracts, etc.; terpenoids; creosote oil; citronella; methyl anthranate; tetramethyl thiruam disulfide; and zinc dimethyl dithiocarbamates. Commercially available gustatory repellants include, but are not limited to, REPELA™ (i.e. masterbatch of denatonium benzoate in EVA available from Aversion Technologies), and BITREX™ denatonium benzoate available from Johnson Matthey. The gustatory repellants used in the practice of this invention are used in known amounts and in known ways. Typically, the gustatory repellent is used in amounts less than 2.5 wt %, or less than 1 wt % or less than 0.5 wt % or less than 0.25 wt %, based on the weight of the inner layer. Typically, the gustatory repellent is used in amounts more than 0.005 wt % or more than 0.01 wt % or more than 0.025 wt %, or more than 0.05 wt %, based on the weight of the inner layer. In one embodiment the pest repellent is a denatonium salt comprising from 0.005 to 2.5 wt %, or from 0.01 to 1 wt %, of the inner layer.

Typical non-gustatory repellants are the insect repellants, and these include, but are not limited to, synthetic pyrethroids; neonicotinoids; sialfluofen; carbamates; metal naphthenates, e.g., copper naphthenate; phosphorous-based compounds, e.g., phoxim, chlorpyrifos, etc.; and chlorinated compounds, e.g., aldrin, chlordane, etc. The non-gustatory repellants used in the practice of this invention are used in known amounts and in known ways as described above for the gustatory repellants.

Like the outer layer, the composition of the inner layer can vary widely, and includes, but is not limited to, polyester, polyamide and polyolefins. Like the outer layer, these polymers can be used alone or in combination with one another. Unlike the outer layer, the inner layer must have Shore D hardness of equal to or greater than (≥) 63, or ≥67.5 as measured by ASTM D2240 and as such, if the polymer does not have an inherent Shore D hardness of ≥63, then the polymer is typically filled with an appropriate filler or another higher hardness polymer to achieve such a hardness.

The filler is any substance that promotes the hardness of the inner layer, e.g., a mineral or milled fiber with a Mohs hardness equal to or greater than 4, or 5; or a polymer with a Shore D hardness of ≥63 as measured by ASTM D2240. Examples of such fillers include, but are not limited to, wollastonite, milled glass fiber, milled aramid fiber, milled carbon fiber, etc. Examples of such polymers include, but are not limited to polypropylene, Nylon 6, Nylon 66, Nylon 11, Nylon 12, polyethylene terephthalate, and polybutylene terephthalate. The milled fibers used in the practice of this invention typically have an aspect ratio (i.e., length over diameter) of less than about 13, or 12, or 11, or 10, or 9, or 8, or 7, or 6, or 5.

The inner layer typically exhibits one, or two, or all three of the following properties: (1) strain at break (%) of greater than (>) 100%, or >150%, or >180% as measured by ASTM D1708, (2) melt index (I2) of >0.1 or >0.2, or >0.3, grams per 10 minutes (g/10 min) as measured by ASTM D1238 (2.16/190° C.), and (3) Young's Modulus of >1,000 mega-Pascals (MPa), or >1,200 MPa, or >1,500 MPa as measured by ASTM D1708.

In the formation of the inner layer, the repellant is blended with the polymer or polymers or polymers and fillers that will form the inner layer until a relatively homogeneous mix is obtained. The blending is typically done in the extruder or batch mixer from which the inner layer is formed, and it is conducted at a temperature that will not degrade, or at least will minimize any degradation, of the repellant. In this regard, filled polyolefins, particularly filled high density polyethylenes (HDPE), are favored because they typically process at temperatures below that required for processing polyesters and polyamides (which exhibit a greater Shore D hardness than unfilled HDPE). Processing temperatures for polyamides are typically at least 10° C. above the melting point of the specific polyamide with Nylon 6 typically processed between 230° C. and 280° C., and Nylon 66 typically processed between 260° C. and 290° C. Processing temperatures for polyesters are typically at least 10° C. above the melting point of the specific polyester with polyethylene terephthalate typically processed between 265° C. and 280° C., and polybutylene terephthalate typically processed between 250° C. and 280° C. Processing temperatures for polyolefins can range from about 150° C. or below for elastomers, to 160-200° C. for LDPE and LLDPE, and up to 230° C. for HDPE and polypropylene. In one embodiment the inner layer is a filled polyolefin. In one embodiment the inner layer is a filled polyethylene. In one embodiment the inner layer is a filled, high density polyethylene.

Optional Tie Layer

The protective jacket of this invention can comprise a tie layer to promote adhesion between the inner and outer layers. Typically the tie layer comprises an adhesive polymer selected for its compatibility and/or reactivity with the two layers that it is joining. Representative tie layer polymers include, but are not limited to, anhydride modified polyolefins, maleated polyethylene, polyacrylates and poly (meth)acrylates and their copolymers including glycidyl methacrylate copolymers, ionomers, natural and/or synthetic rubbers, polyacetates including ethylene-vinyl acetate copolymers, polyurethanes, polyesters, and the like. If present, then the tie, i.e., adhesive, layer is prepared and applied in known ways using known equipment.

In one embodiment, tie layer polymer is directly compounded into the exterior layer and/or inner layer materials to promote adhesion between the two layers without utilizing a discrete tie layer between the exterior and inner layer.

Optional Additives

The multilayer protective jackets of this invention can comprise one or more additives in one or more of its layers. These additives include, but are not limited to, antioxidants, UV-inhibitors, slip agents (typically for the outer layer), olfactory repellants (for the inner layer), dyes, flame retardants (typically nonhalogenated), fillers, processing agents, cure agents, and the like. These optional additives are used in known ways and in known amounts.

Fabrication

The multilayer protective jacket of this invention is typically made by co-extruding the individual layers onto and about a cable intermediate as the last step in the manufacture of the cable. The manufacture of cable is well known in the art, and is illustrated in such publications as U.S. Pat. Nos. 5,246,783, 6,496,629 and 6,714,707.

The invention is further illustrated by the following examples.

EXAMPLES

Incorporation of Denatonium Benzoate into Plastic Substrates as Controls

REPELA for Rodents into DGDA-6318BK.

REPELA' for Rodents (6.15 grams (g)) is a masterbatch of powerful aversives of 5% denatonium benzoate in ethylene-vinyl acetate copolymer($T_m$ 87° C.) for deterring animals and is available from Aversion Technologies, and DGDA-6318 BK high density polyethylene (198.85 g) (HDPE, melt index (I2) of 0.70 grams per 10 minutes (g/10 min) at 190° C./2.16 kg (ASTM D1238) and a density of 0.954 grams per cubic centimeter (g/cc) (ASTM D792)) black available from The Dow Chemical Company) are dried mixed together overnight in a 70° C. in a vacuum oven. The polymers are added to a 190° C. HAAKE™ Rheomix 3000p with roller rotors at 10 revolutions per minute (rpm) with mixing for 1 minute. The roller speed is then increased stepwise over 2 minutes to 60 rpm with material fluxed for 6.5 minutes at 60 rpm and then removed from the mixer and pressed into sheets while still hot. For physical testing, material is cut into small pieces and dried in vacuum oven overnight at 70° C. prior to molding into plaques. On a Carver press plaques are molded at 200° C. with 3 minutes at 21 MPa, 3 minutes at 69 MPa, and 1 minute at 138 MPa with plaques cooled under pressure using water cooled platens. For tensile bars, a 5"×5"×0.072" chase is used for compression molding with microtensile bars stamped out. Tensile testing is performed according to ASTM D-1708 with microtensile bars at rate of 2 inches/minute. Notched Izod test specimens are molded in similar fashion using a chase about 0.125" thick. Notched Izod are performed according to ASTM D-256 at 23° C. Melt index (I2) is measured grams per 10 minutes (g/10 min) at 190° C./2.16 kg (ASTM D1238).

Denatonium Benzoate into DGDA-6318BK/AMPLIFY TY1053H/Nylon 6.

Dry Nylon 6 AEGIS H55WC-LP (24.21 g), a medium viscosity, heat stabilized Nylon 6, $T_m$ 220° C. wire jacketing resin available from AdvanSix, is rolled in a jar at room temperature (23° C.) with a solution of denatonium benzoate (0.3075 g) from TCI America and deionized water (0.95 g) for 6 hours, and then DGDA-6318 HDPE (176.69 g) is added to the jar and rolled overnight (12 hours). The rolled mixture is then dried overnight in a 70° C. in a vacuum oven. AMPLIFY™ TY1053H from Dow Chemical (4.10 grams) is added to the rolled, dried mixture just before mixing in the HAAKE™ mixer The polymers are added to a 232.5° C. HAAKE™ Rheomix 3000p with roller rotors at 10 rpm with mixing for 1 minute. The roller speed is then increased stepwise over 2 minutes to 60 rpm with material fluxed for 6.5 minutes at 60 rpm and then removed from mixer and pressed into sheet while still hot.

Denatonium Benzoate into Nylon 6.

Dry Nylon 6 AEGIS H55WC-LP (205 g), a medium viscosity, heat stabilized Nylon 6, $T_m$ 220° C. wire jacketing resin available from AdvanSix, is rolled in a jar at room temperature (23° C.) with a solution of denatonium benzoate (0.3075 g) from TCI America and deionized water (1.80 g) overnight (12 hours). The rolled mixture is dried overnight in a 70° C. vacuum oven. The polymers are added to a 232.5° C. HAAKE™ Rheomix 3000p with roller rotors at 10 rpm with mixing for 1 minute. The speed is then increased stepwise over 2 minutes to 60 rpm with material fluxed for 6.5 minutes at 60 rpm and then removed from mixer and pressed into sheet while still hot.

Denatonium Benzoate into UNIVAL DMDA-6400 NT7 with Wollastonite and AMPLIFY™ TY1053H.

Denatonium benzoate (0.338 g) and the wollastonite VANSIL™ W40 from RT Vanderbilt (45.00 g) are dry mixed in a jar on rollers for 2 hours then dried overnight (12 hours) in a 70° C. vacuum oven. AMPLIFY™ TY1053H (3.60 g available from The Dow Chemical Company) is a maleic anhydride grafted HDPE with a density of 0.958 g/cc and an I2 of 2.0 g/10 min, and UNIVAL' DMDA-6400 NT-7 is a multi-purpose HDPE homopolymer (176.40 g available from The Dow Chemical Company) with a density of 0.961 g/cc and an I2 of 0.80 g/10 min are dry mixed together and dried overnight (12 hours) in a 70° C. vacuum oven. The polymers are added to a 190° C. HAAKE™ Rheomix 3000p with roller rotors at 10 rpm with mixing for 1 minute. The speed is then increased stepwise over 2 minutes to 60 rpm, fluxed for 2 minutes with speed slowed to 30 rpm with wollastonite/denatonium benzoate mixture added over 4 minutes. The speed is then increased to 60 rpm and material fluxed for 5 minutes at 60 rpm, and then removed from mixer and pressed into sheet while still hot. For physical testing, material is cut into small pieces and dried in vacuum oven overnight at 70° C. prior to molding into plaques. On a Carver press plaques are molded at 200° C. with 3 minutes at 21 MPa, 3 minutes at 69 MPa, and 1 minute at 138 MPa with plaques cooled under pressure using water cooled platens. For tensile bars, a 5"×5"×0.072" chase is used for compression molding with microtensile bars stamped out. Tensile testing is performed according to ASTM D-1708 with microtensile bars at rate of 2 inches/minute. Notched Izod test specimens are molded in similar fashion using a chase about 0.125" thick. Notched Izod are performed according to ASTM D-256 at 23° C. Melt index (I2) is measured grams per 10 minutes (g/10 min) at 190° C./2.16 kg (ASTM D1238.

Leaching Studies.

The above materials containing denatonium benzoate are cut into small pieces and re-dried overnight (12 hours) in a 70° C. vacuum oven. The dried material are molded in a 6 inch by 6 inch chase that is 2 mm thick on a CARVER™ press with pressure applied for 3 minutes at 21 MPa, 3 minutes at 69 MPa, and 1 minute at 138 MPa and cooled between water cooled platens. For the REPELA™/DGDA-6318 and Denatonium Benzoate/VANSIL™ W40/AMPLIFY™ TY1053H/DMDA-6400 NT7 material the CARVER™ press is set at 200° C. For denatonium benzoate/DGDA-6318-BK/Nylon 6 material and the denatonium benzoate/Nylon 6 materials the press is set at 255° C. From these molded plaques are cut 0.5 inch wide and 2.0 inch long coupons for the leaching studies.

Measurements of Leaching of Denatonium Benzoate During Water Submersion

Six coupons each for control conditions in FIGS. 2A-2B and 3 and two laminate coupons for each inventive composition and control in FIG. 4 tested are weighed into clean polypropylene 50 milliliter (mL) centrifuge tubes. Approximately 40 g of ultrapure water are weighed in with the coupons. The coupons are incubated at room temperatures (23° C.) and small aliquots are withdrawn periodically to determine the concentrations of denatonium and its breakdown product, lidocaine in solution (FIG. 1). This allows determining the absolute and relative leaching rates from coupons made from HDPE, HDPE with added NYLON, or pure NYLON (FIGS. 2A-B and 3) or from laminated versus not-laminated HDPE coupons (FIG. 4). The sum of the measured amount (moles) of denatonium and lidocaine in the solutions is subtracted from the total moles of denatonium benzoate initially present in the coupons to calculate the percentage of denatonium that escapes and that can be measured in the water (FIG. 3).

At each time point, 100 microliters (µL) are withdrawn from the incubations. The removed aliquot is combined with 100 µL of 0.2% aqueous formic acid in a polypropylene high-performance liquid chromatography (HPLC) vial and the resulting solution is analyzed by the HPLC mass spectrometry (HPLC-MS) procedure described below.

Standards for the quantitation of the leachate ranging from 10 parts per million (ppm) to 5 parts per billion (ppb) are prepared from denatonium benzoate and lidocaine hydrochloride standard materials by accurately weighing approximately 100 mg of the materials into a polypropylene bottle and accurately adding water to a total weight of approximately 100 grams followed by serial dilution in 0.2% formic acid in polypropylene centrifuge tubes to afford concentrations over the complete desired range. It is necessary to acidify all sample solutions and to use plastic containers to avoid loss of the analytes. In addition to these standards, quality control samples are prepared separately from the solid standards periodically at levels between 10 ppb and 1 ppm to verify the accuracy of the method. Recovery is determined to be 97% at the 1 ppm level by a spike recovery experiment.

The denatonium and lidocaine cations are measured in selective ion monitoring mode (SIM) by a Q-EXACTIVE™ mass spectrometer (Thermo Scientific, San Jose) at 325.228 Th (denatonium) and 235.181 Th (lidocaine). Note that the use of a high resolution ORBITRAP™ mass spectrometer affords additional selectivity over a traditional unit resolution mass selective detector by excluding isobaric interferences of the same nominal mass. Quantification proceeded by comparing the integrated peak areas from 235.1782-235.1830 Th for lidocaine and 325.2246-325.2312 Th for denatonium against a standard curve prepared from the standards prepared by the procedure described in the previous paragraph. The standard curves are built from duplicate injections of at least 4 standards over a concentration range that brackets the concentrations of the analytes in the leachate samples. Standards are injected before and after sample injections to insure against instrumental drift.

Of all samples, standards, blanks, and quality control samples, 1 µL is injected onto the HPLC-MS system, which consisted of a DIONEX™ 300 LC coupled to the Q-EXACTIVE™ mass spectrometer. The analytes are separated from each other and matrix peaks by gradient elution from a reverse phase HPLC column (Agilent InfinityLab Poroshell 120 EC-C18, 50 mm×3 mm×2.7 µm) at a flow rate of 0.8 mL/min and 35° C. Mobile phase A consisted of water with 1 g/L ammonium formate and 1 mL/L formic acid (pH=3.5) and mobile phase B is acetonitrile. The gradient program is as follows: 10% B for 0.5 min, to 95% B at 5 min, hold until-6 min, return to 10% B at 6.5 min- and hold to 9 min. The retention time of lidocaine is sensitive to mobile phase pH. In contrast, the retention time of denatonium is practically independent of buffer pH since the molecule bears a permanent positive charge, being a tertiary amine.

The column effluent is ionized using positive mode electrospray ionization (ESI) with the following parameters: 4 kilovolt (kV) spray voltage, 60 units sheath gas, 20 units auxiliary gas, 300° C. probe temperature, 320° C. inlet capillary temperature, S-lens setting of 50 units. Mass analysis is conducted with the following parameters, which were found to yield the most linear calibration curves over the widest range of concentrations, while giving a sufficient number of points across the peaks for quantitation:

The mass spectrometer acquisition parameters are: 35,000 resolution (FWHM at 200 Th), 50,000 charges AGC target, 200 ms maximum injection time, 4 Th isolation window around the molecular ions at 325.228 and 235.181 Th, centroid data acquisition. Data for lidocaine is collected from 1.75 to 2.75 min around its retention time of 2.28 min and data for denatonium is collected from 2.75 to 4 min around its retention time of 3.43 min.

Note that it may be advantageous to vary the injection volume or the mass spectrometer AGC target setting to achieve the required sensitivity at very low concentrations of the analytes, as may be the case in the early stages of leaching from laminated coupons. Adjustments may also be indicated to achieve good linearity at high concentrations of the analytes, as may be measured after several weeks leaching from unprotected coupons.

Fabrication of Laminates with Higher Hardness, Filled HDPE-Inventive Examples

The laminates are prepared by first taking the Denatonium Benzoate into DMDA-6400 NT7 with Wollastonite and AMPLIFY™ TY1053H utilized in the control and drying overnight in a 70° C. vacuum oven. A thin film of AMPLIFY™ GR216 to be used for laminate is pressed at 200° C. between sheets of aluminum 0.38 mm thick and cooled to room temperature. Thin films of polybutylene terephthalate (PBT) used for the laminates are prepared by utilizing a chase 6"×6" and 0.125 mm thick and compression molding 6 grams of PBT (dried overnight in 70° C. vacuum oven) between aluminum 0.38 mm thick on a 250° C. CARVER™ press with 2 minutes at 21 MPa and 2 minutes at 69 MPa with cooling between room temperature metal plates with PBT film removed from chase. Thin films of DMDA 6400 NT7/AMPLIFY™ TY1053H/wollastonite (78.4/1.6/20, w/w/w) used for the laminates are prepared by utilizing a chase 6"×6" and 0.125 mm thick and compression molding 5 g of filled HDPE (dried overnight in 70° C. vacuum oven) between aluminum 0.38 mm thick on a 200° C. CARVER™ press with 2 minutes at 21 MPa and 2 minutes at 69 MPa psi with cooling between room temperature metal plates and film is left in the chase.

MYLAR™ Laminate (PET—Polyethylene Terephthalate)

The laminate is prepared by taking MYLAR™ film (0.125 mm thick) and placing the thin film of AMPLIFY™ GR216 on top of it, then placing the 6 inch by 6 inch chase that is 2 mm thick on top of the AMPLIFY™ GR216 with the chase is filled with same mass of denatonium benzoate in DMDA-6400 NT7 with wollastonite and AMPLIFY™ TY1053H utilized in the control with a thin film of AMPLIFY™ GR216 placed on top of the chase containing denatonium benzoate in DMDA-6400 NT7 with wollastonite and AMPLIFY™ TY1053H and another piece of MYLAR™ film placed on top of it. This assembly between aluminum sheet 0.38 mm thick is placed on a 200° C. CARVER™ press with pressure applied for 3 minutes at 21 MPa, 3 minutes at 69 MPa, and 1 minute at 138 MPa psi and cooled between room temperature metal plates. From this molded laminate is cut 0.5 inch wide and 2.0 inch long coupons for the leaching studies.

Polybutylene Terephthalate (PBT) Laminate

The laminate is prepared by taking the prepared PBT film and placing the thin film of AMPLIFY™ GR216 on top of it, then placing the 6 inch by 6 inch chase that is 2 mm thick on top of the AMPLIFY™ GR216 with the chase is filled with same mass of denatonium benzoate in DMDA-6400 NT7 with Wollastonite and AMPLIFY™ TY1053H utilized in the control with a thin film of AMPLIFY™ GR216 placed on top of the chase containing denatonium benzoate in DMDA-6400 NT7 with wollastonite and AMPLIFY™ TY1053H and another piece of the prepared PBT film placed on top of it. This assembly between aluminum sheet 0.38 mm thick is placed on a 200° C. CARVER™ press with pressure applied for 3 minutes at 21 MPa, 3 minutes at 69 MPa, and 1 minute at 138 MPa and cooled room temperature metal plates. From this molded laminate is cut 0.5 inch wide and 2.0 inch long coupons for the leaching studies.

Filled HDPE Laminate

A laminate component is prepared by molding in the 6 inch by 6 inch chase that is 2 mm thick and filling with same mass of denatonium benzoate in DMDA-6400 NT7 with wollastonite and AMPLIFY™ TY1053H utilized in the control between aluminum sheet 0.38 mm thick and molding on a 200° C. CARVER™ press with 2 minutes at 21 MPa and 2 minutes at 69 MPa and cooled between room temperature metal plates and left in the chase. For the laminate, on the aluminum sheet 0.38 mm thick is first placed the thin film of DMDA 6400 NT7/AMPLIFY™ TY1053H/wollastonite (78.4/1.6/20, w/w/w) in the 0.125 mm chase with the denatonium benzoate in DMDA-6400 NT7 with wollastonite and AMPLIFY™ TY1053H in the 2 mm thick chase placed on top of it with another thin film of DMDA 6400 NT7/AMPLIFY™ TY1053H/wollastonite (78.4/1.6/20, w/w/w) in the 0.125 mm chase placed on top of it with aluminum sheet 0.38 mm thick placed on top to complete the assembly. This assembly is placed on a 200° C. CARVER™ press with pressure applied for 1.5 minutes at 21 MPa and 1.5 minute at 69 MPa and cooled between room temperature (23° C.) metal plates. From this molded laminate is cut 0.5 inch wide and 2.0 inch long coupons for the leaching studies.

Denatonium benzoate leaching results for the laminates and control of wollastonite filled HDPE of DMDA 6400 NT7 with denatonium benzoate are summarized in FIG. 4 with experiment run and measured as previously described for the unfilled Control samples.

Incorporation of Fillers into HDPE Plastic Substrates for Higher Hardness UNIVAL™ DMDA 6400 NT7/AMPLIFY™ TY1053H/Wollastonite (78.4/1.6/20, w/w/w)

UNIVAL™ DMDA-6400 NT-7 HDPE from Dow Chemical (176.40 grams) and AMPLIFY™ 1053 H from Dow Chemical (3.60 grams) pellets are dry blended in one jar and wollastonite VANSIL™ W40 from RT Vanderbilt filler (45.00 grams) is placed in another jar with both dried overnight in 70° C. vacuum oven. The polymers are added to a 190° C. HAAKE™ Rheomix 3000p with roller rotors at 10 rpm for 1 minute with speed increased stepwise to 60 rpm over 2 minutes; speed is reduced to 30 rpm with filler added over 3 to 4 minutes with speed increased to 60 rpm and materials fluxed for 5 minutes then removed from mixer and pressed into sheet while hot.

For physical testing of unfilled polymer controls, pellets are dried overnight in a 70° C. vacuum oven. The dried materials are molded on a 200° C. CARVER™ press for polyethylene based materials and at 255° C. for Nylon 6 based materials with pressure applied for 3 minutes at 21 MPa, 3 minutes at 69 MPa, and 1 minute at 138 MPA and cooled on between water cooled platens. For tensile bars, a 5"×5"×0.072" chase is used for compression molding with microtensile bars stamped out. Tensile testing is performed according to ASTM D-1708 with microtensile bars at rate of 2 inches/minute. Notched Izod test specimens are molded in similar fashion using a chase about 0.125" thick. Notched Izod are performed according to ASTM D-256 at 23° C. Melt index (I2) is measured grams per 10 minutes (g/10 min) at 190° C./2.16 kg (ASTM D1238).

Mechanical properties of the filled HDPE with denatonium benzoate as well as the unfilled materials are summarized in Table below:

TABLE

Physical Properties of Various Polymers Filled and Unfilled

| Material | Notched Izod, 23° C., J/m | Young's Modulus, MPa | Max stress, MPa | Strain at break, % | Strain at yield, % | Stress at yield, % | Shore D Hardness | Melt Index, g/10 min |
|---|---|---|---|---|---|---|---|---|
| AEGIS H55WC-LP - NYLON 6 | 84.1 | 730 | 72.4 | 363 | 14.7 | 36.5 | 66.9 | Not measured |
| DGDA-6318 BK -- high density polyethylene | 84.8 | 785 | 24.5 | 816 | 8.9 | 20.5 | 57.0 | 0.70 |
| UNIVAL ™ DMDA-6400 NT-7 high density polyethylene | 117.1 | 1025 | 31.2 | 887 | 9.5 | 30.4 | 61.2 | 0.67 |
| Denatonium Benzoate into UNIVAL DMDA-6400 NT7 with Wollastonite and AMPLIFY ™ TY1053H | 53.7 | 1764 | 32.2 | 198 | 7.1 | 32.2 | 68.3 | 0.50 |

The Table shows how the high density polyethylene UNIVAL™ DMDA-6400 NT7 filled with 20% wollastonite as compared to the unfilled UNIVAL™ DMDA-6400 NT7 and the jacketing materials of AEGIS H55WC-LP and DGDA-6318 BK has an increased tensile modulus and Shore D hardness with the increases contributing to improved material resistance to pests. The strain at break of 198% for the high density polyethylene UNIVAL™ DMDA-6400 NT7 filled with 20% wollastonite is reduced as compared to the unfilled materials in the Table, and the strain at break is greater than 100%. The Table shows that the filled high density polyethylene UNIVAL™ DMDA-6400 NT7 filled with 20% wollastonite has a small reduction of melt index as compared to the unfilled parent material and should have comparable good processability.

What is claimed is:

1. A multilayer protective jacket for a cable, the jacket comprising:
   (A) an outer layer (1) free of a pest repellant, and (2) having external and internal facial surfaces;
   (B) an inner layer (1) having a Shore D hardness of equal to or greater than (≥) 63, (2) comprising a pest repellant, and (3) having two facial surfaces, and wherein the inner layer has Young's Modulus of >1,000 MPa as measured by ASTM D1708; and
   (C) optionally, a tie layer in contact with the internal facial surface of the exterior layer and a facial surface of the inner layer.

2. The protective jacket of claim 1 in which the outer layer has a Shore D hardness of ≥67.5.

3. The protective jacket of claim 1 in which the repellant is a gustatory repellant.

4. The protective jacket of claim 3 in which the repellant is at least one of a capsaicinoid or denatonium salt.

5. The protective jacket of claim 1 in which the repellant is a non-gustatory repellant.

6. The protective jacket of claim 1 in which the repellant comprises both a gustatory and a non-gustatory repellant.

7. The protective jacket of claim 1 in which the tie layer is present.

8. The protective jacket of claim 7 in which the tie layer comprises one or more of an anhydride modified polyolefin, a maleated polyethylene, a polyacrylate, a poly(meth)acrylate, an ionomer, a natural rubber, a synthetic rubber, a polyacetate, a polyurethane, and a polyester.

9. The protective jacket of any of claim 1 in which the tie layer is absent and the internal facial surface of the outer layer is in contact with a facial surface of the inner layer.

10. The protective jacket of claim 1 in which the inner layer has at least one of the following properties: elongation at break of greater than (>) 100% as measured by ASTM D1708 and (2) melt index (I2) of >0.1 g/10 min as measured by ASTM D1238 (2.16/190° C.).

11. The protective jacket of claim 10 in which the inner layer has at least two of the properties.

12. The protective jacket of claim 10 in which the inner layer has all three of the properties.

13. A cable comprising the protective jacket of claim 12.

* * * * *